United States Patent [19]

Seiderman

[11] 4,068,933

[45] Jan. 17, 1978

[54] FENESTRATED HYDROGELS FOR CONTACT LENS USE AND METHOD FOR MAKING SAME

[76] Inventor: Maurice Seiderman, 3306 Deronda Drive, Hollywood, Calif. 90068

[21] Appl. No.: 559,575

[22] Filed: Mar. 18, 1975

[51] Int. Cl.² .......................... G02C 7/04; B29D 11/00
[52] U.S. Cl. .................................. 351/160; 351/177; 264/1
[58] Field of Search .................... 351/160, 177; 264/1, 264/317, 334

[56] References Cited

U.S. PATENT DOCUMENTS

| 3,220,960 | 11/1965 | Wichterle et al. ............... 351/160 X |
| 3,699,089 | 10/1972 | Wichterle ........................ 351/160 X |
| 3,767,759 | 10/1973 | Wichterle et al. ............... 351/160 X |

FOREIGN PATENT DOCUMENTS

| 931,007 | 9/1947 | France .................................. 351/160 |
| 1,474,668 | 2/1967 | France .................................. 351/160 |
| 659,788 | 10/1951 | United Kingdom ................ 351/160 |

Primary Examiner—David H. Rubin
Attorney, Agent, or Firm—Bacon & Thomas

[57] ABSTRACT

A process for the reproducible manufacture of fenestrated hydrogels is described whereby unpolymerized hydrogel monomers are cast, polymerized in the mold and fenestrations produced in situ.

7 Claims, 8 Drawing Figures

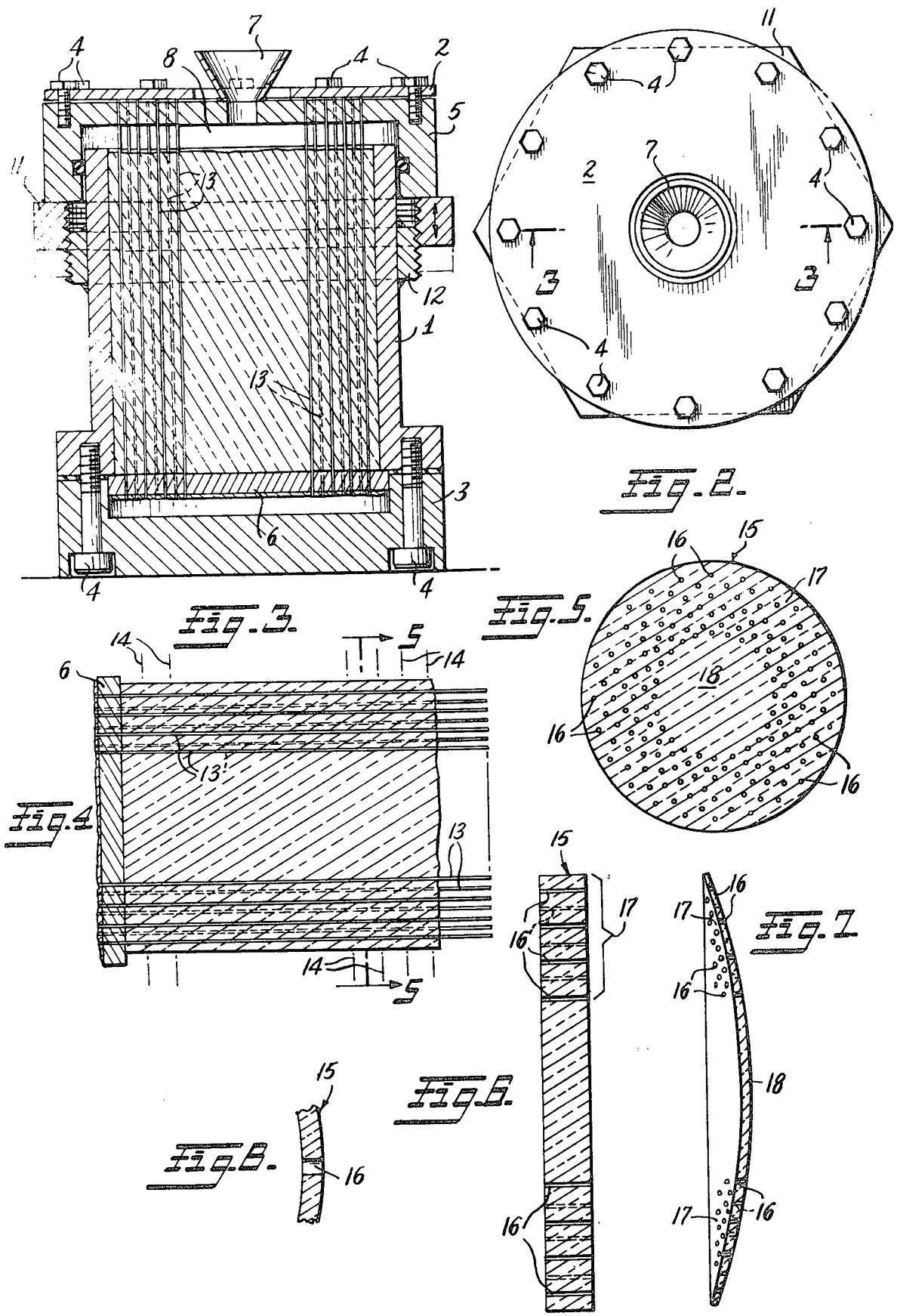

FENESTRATED HYDROGELS FOR CONTACT LENS USE AND METHOD FOR MAKING SAME

BACKGROUND OF THE INVENTION

Recently, the ophthalmic arts have experienced an increasing acceptance and demand for contact corrective lenses which are fitted directly to the eyeball of the wearer to effect optical correction therefor. This demand has resulted from many considerations, such as cosmetics, convenience, etc., unaffordable by standard eyeglasses. Notwithstanding the broad base of acceptance of such ophthalmic devices, certain ingenerate problems with these systems have arisen, particularly in view of the proximity of the corrective device to the very sensitive eyeball.

The first, most widely employed contact lens may be described as the hard lens which is a rigid, ground glass or optical grade plastic (polymethylmethacrylate) individually fitted to the wearer's eye. While these hard lenses are capable of providing exacting optical correction, by virtue of their hardness and lack of resilience, they pose certain significant problems to the wearer. Most notably, due to their rigidity, the cornea of the eye is forced to adapt to the concave topography of the corrective lens, which may result in significant discomfort during the initial period of wear. Moreover, it is well known that this variety of corrective contact lens is highly susceptible to dislodgment and possible loss from even simple eyeball movements. Such problems have become increasingly more pronounced as the diameter of these corrective lenses have been reduced to a size approaching that of the pupil.

In response to the various inherent deficiencies manifested by the hard-type contact lenses, soft, hydrophilic lenses have experienced increasing popularity. In contradistinction to the hard lenses, these hydrophilic lenses are very supple and resilient in their hydrated condition. Accordingly, they will adapt to the exterior topography of the cornea and, being generally larger in diameter than hard lenses and typically covering the cornea as it is defined at the peripheries thereof by the sclera, will add to the pressure on the limbus. By virtue of these characteristics, the ease of wear is considerably enhanced while the frequency of dislodgment is similarly reduced. However, there are yet other significant problems posed by these semi-scleral, hydrophilic ophthalmic devices.

The most notable shortcoming of the soft, hydrophilic lenses currently marketed for optical correction centers about reduced fluid and oxygen permeability therethrough. As noted above, this type of lens typically covers the entire corneal region effectively masking same from the atmosphere. It is well known that the outer surface of the eyeball requires both lubrication and oxygen for proper health and that lack of these essentials promotes, for example, edema. Currently, these rather large corrective devices often result in eye irritation to the wearer as the result of interference with the ordinary lubrication and oxygen demands of the eyeball. Presently, these hydrophilic devices rely primarily upon conditions established in and under the flexible lens and when the wearer blinks to allow tear fluids to wash between the outer surface of the cornea and inner, concave surface of the lens, thus providing some minimal amount of lubrication. Additionally, as the tear fluid is drawn behind the lens, some oxygen entrained in the fluid will similarly be caused to pass between the cornea and the lens. However, the ability of this system to provide adequate volumes of both lubricating tear fluid and oxygen are highly unsatisfactory. Such problems necessitate frequent removal and restricted periods of wear to permit regeneration and repair of the tissue.

These deficiencies have been recognized for decades. Note, for example, U.S. Pat. No. 2,393,266 to Riddell which is directed to the concept of providing a plurality of perforations in the peripheral areas of these scleral lenses to promote lubrication of the eye. Many techniques have been developed to achieve these ends, those most notable being conventional drilling and trephining as well as the more recent techniques of laser drilling. See, for example, U.S. Pat. No. 3,688,386. Each of the aforementioned, however, has proven unsatisfactory for one or more reasons. The conventional drilling or trephining techniques yield perforations, more properly termed fenestrations, which are of relatively large diameter and exhibit intolerable roughness both along the surface of the lens as well as the interior dimensions of the fenestration. Laser techniques have shown some promise; however, the expense involved to achieve even a minimal number of fenestrations has proven prohibitive. Regardless of the fenestration producing technique employed, i.e., conventional or laser drilling, system limitations per se provide inadequate results. Since each is fundamentally based upon mechanical systems to effect alignment and production of the fenestrations, the lower limit of fenestration diameter as well as the distance between adjacent fenestrations is significantly restricted. Ideally, fenestrations for ophthalmic lenses should exhibit diameters of 0.001 inch or less and be present in a density sufficient to allow for 100-150 fenestrations about the periphery thereof. Currently, no technique exists to achieve these results. Accordingly, the need exists to simply, yet efficiently provide fenestrated hydrogels suitable for use as corneal or scleral, corrective ophthalmic devices.

SUMMARY OF THE INVENTION

Accordingly, it is the primary object of this invention to provide a method for simply, yet efficiently, manufacturing fenestrated hydrogels adapted for use as, e.g., scleral, ophthalmic corrective lenses.

It is another object of this invention to produce fenestrations in hydrogel polymers adapted for use as ophthalmic corrective lenses which fenestrations are provided in greater numbers and smaller diameter than achievable by prior art techniques.

It is also an object of this invention to produce fenestrations which are characterized as possessing more uniform, smoother side walls than fenestrations produced by prior art techniques.

It is another object of this invention to provide a method for manufacturing these fenestrated hydrogels in quantity, i.e., producing the fenestrations in a plurality of lens blanks simultaneously.

It is yet another object of this invention to produce fenestrated hydrogels wherein the perforations are highly reproducible from lot-to-lot and which may be easily altered in pattern to meet individual requirements.

These and other objects of this invention will become apparent from an inspection of the following detailed description when taken in conjunction with the appended claims and figures of drawing.

In accordance with this invention, it has been determined that lens button precursors may be produced in rod form, which ultimate lens buttons, when cut from the rod, exhibit a plurality of perforations about the periphery thereof by polymerizing a suitable hydrophilic, monomeric material in a mold provided with a plurality of longitudinally extending wires held in a jig. Upon completion polymerization, the molded rod is removed and placed in a swelling agent to facilitate removal of the entrained wires. Subsequent to the withdrawal of the fenestration producing wires, the rod is cut transversely to yield lens buttons which are ground to shape and polished as desired. This process yields a hydrophilic ophthalmic lens possessing fenestrations at the periphery thereof and a central, optical area free from these perforations.

BRIEF DESCRIPTION OF THE DRAWINGS

FIG. 2 is a plan view of the mold used for forming the initial, unfinished rod;

FIG. 3 is a vertical sectional view through the mold, taken on line 3—3 of FIG. 2;

FIG. 4 is a vertical sectional view of the rod removed from the mold;

FIG. 5 is a transverse sectional view, taken on line 5—5 of FIG. 4;

FIG. 6 is an enlarged sectional view of a lens button cut from the rod with the wires being removed;

FIG. 7 is an enlarged sectional view of a finished lens; and

FIG. 8 is an enlarged fragmentary sectional view through one of the apertures in the finished lens.

DETAILED DESCRIPTION OF THE INVENTION

Figure 1:
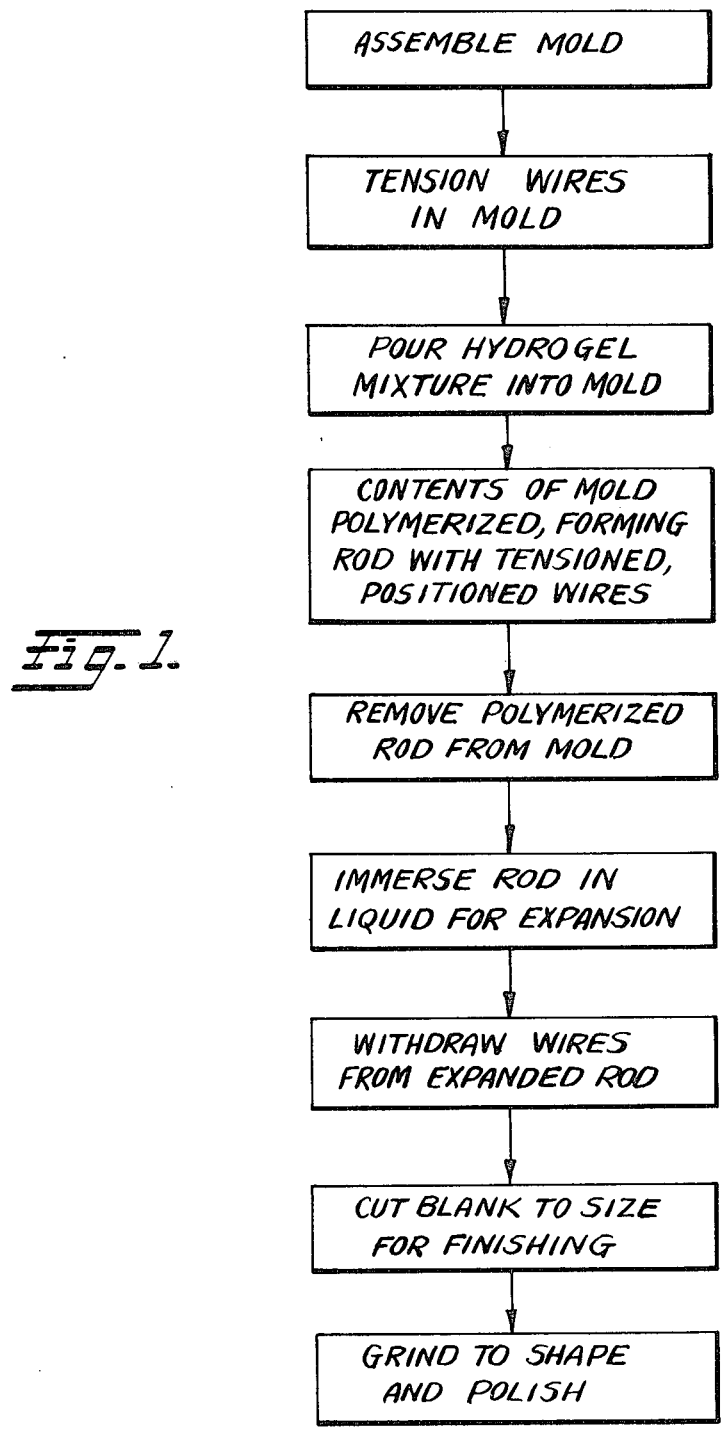
FIG. 1 is a flow diagram illustrating the process for manufacturing a lens according to the present invention.

The invention will now be described in terms of a preferred embodiment, the same being intended as illustrative and in no wise limitative. Briefly, and referring to FIG. 1, fenestrated lenses of the instant invention are produced by assembling a mold of suitable material selected for properties of nonreactance with the hydrophilic monomers to be cast therein as well as the ability for easy removal of the polymerized casting. Typically, mold materials are selected from such commercially available products as polyethylene or polytetrafluoroethylene, etc. which prevent adhesion of the hydrogel polymer to the molds of the wall after it has polymerized into a hard and infusible solid. Once the mold has been assembled, wires of, for example, stainless steel are tensioned in a jig which is removable from the mold, with the wires being arranged in any desired pattern about the periphery thereof. The mold is then closed and the unpolymerized hydrogel mixture introduced thereto. After sufficient time has been allowed for polymerization, the hard and infusible polymeric rod with the wires embedded therein, due to shrinkage of the polymer, is removed to a swelling agent which may be water, aqueous saline or any other swelling agent. The hydrogel, typically a polymeric material bearing free hydrophilic moieties, e.g., free hydroxyl groups, will hydrate or swell in the swelling agent, thus expanding same and allowing easy withdrawal of the wires. Next the rod casting is removed from the swelling agent and allowed to dehydrate to its hard and infusible state. Transverse sections of the rod are then removed to yield lens buttons which are subsequently ground to shape and polished yielding an ophthalmic corrective lens possessing, in the dry state, fenstrations of the same size, shape and finish as the inserted wires and in a pattern corresponding to the placement of these wires in the jig. Thus, lenses produced in accordance with this invention are capable of providing sufficient volumes of lubricating tear fluid and oxygen to the corneal surface during wear of the lens, precluding the deficiencies of the prior art in a simple, yet efficient manner.

Referring to FIGS. 2 and 3 which depict a mold useful for producing the cast rod of hydrogel polymer, the mold body wall 1, defining, mold cavity 8, is securely affixed between upper and lower end plates 2 and 3, respectively, by hold-down bolts 4. Disposed intermediate upper end plate 2 and the mold body wall 1 is the upper jig section 5 which, in cooperation with the lower jig section 6, provides for the accurate and reproducible tensioning of wires 13 within the mold. Tension nut 11, in cooperation with threaded member 12, facilitates the tensioning of the fenestration producing wires 13.

In carrying out the present invention, the jig sections 5 and 6, which may be fabricated from any rigid material such as metal, phenolic, etc., are drilled to provide guide holes for the fenestration producing wires 3 in any desired configuration such as that depicted in FIG. 5. The wires 13 are then placed through these pilot holes in the jig sections and securely fastened thereto. Depending upon the desired diameter of each fenestration, the wires may be selected from any commercially available stock typically obtainable in diameters ranging from approximately 0.050 inches down to 0.001 inches or less and fabricated from such materials as stainless steel and the like. Such selection criteria will be dictated by individual requirements and are well within the purview of the skilled artisan.

The mold is assembled as illustrated in FIG. 2 with the jig sections 5 and 6 bearing the fenestration producing wires held securely in place at the upper extremity by top plate 2 in cooperation with tension unit 11 and at the lower extremity by the rim section defined by mold body wall 1 and bottom end plate 3. Once assembled, tension unit 11 is rotated against threaded member 12 to apply the desired amount of tension on fenestration producing wires 13 to ensure their proper alignment within the mold. wires. Once the mold has been assembled in this fashion, unpolymerized hydrogel material such as those materials described in U.S. Pat. Nos. 2,976,576, 3,220,960, 3,503,942, 3,639,524 and 3,721,657 is introduced through the top end plate 2 via funnel 7. Polymerization may then be conducted in accordance with the techniques and conditions specifically set forth in the aforenoted patents.

The hydrogel monomers are allowed to polymerize to a hard and infusible rod-like mass which, due to the polymerization kinetics, will shrink and securely entrap fenestration producing wires 13. After this has been achieved, the mold is broken open and the rod containing the wires embedded therein is removed to yield a product as depicted in FIG. 4. The upper jig portion 5 is removed and the casting bearing the wires 13 is disposed in a suitable swelling agent, such as water, aqueous saline solution, ethylene glycol, and the like, which causes the rod of hydrophilic material, designated 15 in FIG. 4, to swell. This swelling action will expand the area surrounding wires 13 facilitating removal thereof by application of force to jig member 6. Subsequent to the removal of the fenestration producing wires 13, the hydrogel rod is removed from the swelling agent and allowed to return to its solid, infusible state. The rod, 15, may then be scored with a plurality of guide markings 14 and transversely cut to yield buttons such as that depicted in FIG. 6.

Buttons of the solid, infusible polymer are characterized as possessing a peripheral zone 17 with a plurality of fenestrations 16 therein, and a central, optical zone 18 free from these fenestrations. The button may then be ground to shape and polished to yield a final lens as illustrated in FIG. 7.

It will be appreciated that the individual apertures 16, as shown in fragmentary view 8 will exhibit an internal diameter, in the dry state, corresponding exactly to that of the fenestrations producing wires 13, which will, of course, be somewhat larger when hydrated. Furthermore, the side walls of the apertures will similarly correspond identically to the surface topography of the wires and, thus, by ensuring a smooth, highly polished wire surface, these apertures may be produced with superior quality as compared with those resulting from such techniques as conventional or laser drilling typically characterized as possessing rough and irregular side walls permitting an area for bacterial breeding.

It will further be appreciated that the fenestration pattern in peripheral zone 17 may be altered in any desired fashion to provide lubricating tear fluid and oxygen to selected portions of the wearer's eyeball. Similarly, any number of fenestrations may be produced to meet individual needs, although it has been found that the higher the density the better it is for the wearer, particularly if the fenestrations are out of the limbal area. Additionally, it will be appreciated that the number of lens buttons obtainable from a single casting will be dictated solely by the ability of the mold to produce a uniform rod of any desired length.

Thus, this invention provides a simple, yet highly efficient method for producing fenestrated hydrogels for use as contact corrective lenses. The method is entirely reproducible from lot-to-lot and may be simply altered to meet any individual requirements. The fenestrations produced by the instant invention are uniform and exhibit superior qualities, as compared with the methods heretofore employed, to provide sufficient tear fluid and oxygen to the eyeball of the wearer. Additionally, this method will allow the producer to make numerous jigs in advance corresponding to fenestration size and number as well as pattern. These jigs may provide fenestration sizes within the range of from about 0.0001 inches to about 0.125 inches in diameter with density in the range of from about 1 to about 1000 fenestrations per square centimeter. These pre-fabricated jigs may easily be stored and used at will without the need for complicated, costly setup of precision apparatus.

While there have been shown and described and pointed out the fundamental novel features of the invention as applied to the preferred embodiment, it will be understood that various omissions and substitutions and changes in the form and details of the mold and associated apparatus may be made by those skilled in the art without departing from the spirit of the invention. It is the invention, therefore, to be limited only as indicated by the scope of the following claims.

What is claimed is:

1. A method for producing fenestration hydrogels adapted for use as ophthalmic corrective contact lenses comprising the steps of:
   a. confining unpolymerized hydrogel monomers within a container;
   b. adjustably tensioning a plurality of spaced, substantially parallel elongate, substantially uniform members disposed within said container;
   c. polymerizing said confined hydrogel monomers to a solid, non-swollen infusible mass;
   d. disposing said polymerized hydrogel with uniform members in a swelling agent for said hydrogel; and
   e. withdrawing said uniform members intact from said hydrogel thereby yielding a hydrogel casting characterized as possessing a plurality of fenestrations corresponding to the regions defined by said removed elongate members, and whereby said uniform members are capable of reproducible reuse.

2. The method of claim 1, further comprising the steps of:
   a. removing said hydrogel casting from said swelling agent;
   b. removing said swelling agent from said hydrogel casting thereby rendering said hydrogel casting solid and infusible; and
   c. sectioning said solid infusible hydrogel to yield ophthalmic lens buttons.

3. The method of claim 2, further comprising the steps of:
   a. grinding said lens buttons; and
   b. polishing said lens buttons.

4. A fenestrated hydrogel adapted for use as an ophthalmic corrective contact lens produced by the method of claim 1.

5. The ophthalmic lens of claim 4, wherein said fenestrations are confined to a zone corresponding to the sclera of the eyeball.

6. The ophthalmic lens of claim 4, wherein said fenestrations are from about 0.0001 inches to about 0.0625 inches in diameter, when said lens is in the dry state.

7. The fenestrated lens of claim 6, wherein said fenestrations are present in a number density ranging from 1 to 1000 per square centimeter.

* * * * *